United States Patent
Schickfluss et al.

[11] 3,883,504
[45] May 13, 1975

[54] WATER-INSOLUBLE CARBONYLALKYLENE SULFONAMIDO CONTAINING AZO DYESTUFFS

[75] Inventors: Rodolf Schickfluss, Frankfurt am Main; Willi Steckelberg, Hofheim, Taunus, both of Germany

[73] Assignee: Hoechst Aktiengesellschaft, Frankfurt am Main, Germany

[22] Filed: Jan. 30, 1973

[21] Appl. No.: 328,064

[30] Foreign Application Priority Data
Feb. 3, 1972 Germany............................ 2205062

[52] U.S. Cl. .............. 260/207.1; 260/152; 260/155; 260/156; 260/157; 260/158; 260/163; 260/187; 260/207; 260/470; 260/481 R; 260/556 A; 260/556 AR
[51] Int. Cl. ........................ C09c 29/06; C09c 29/34
[58] Field of Search ........ 260/207, 207.1, 174, 177, 260/184, 187

[56] References Cited
UNITED STATES PATENTS

| | | | |
|---|---|---|---|
| 1,718,882 | 6/1929 | Schwenk et al. | 260/207 |
| 3,178,405 | 4/1965 | Merian | 260/207 |
| 3,398,137 | 8/1968 | Mueller | 260/207 |
| 3,483,180 | 12/1969 | Ramanathan | 260/207 |
| 3,534,016 | 10/1970 | Lange | 260/207 |
| 3,544,548 | 12/1970 | Gunther et al. | 260/207 |
| 3,549,305 | 12/1970 | Renfrew et al. | 260/207 |
| 3,552,905 | 1/1971 | Sartori | 260/207 |
| 3,642,767 | 2/1972 | Hahn et al. | 260/207 |
| 3,679,657 | 7/1972 | Desai et al. | 260/207 |

*Primary Examiner*—Henry R. Jiles
*Assistant Examiner*—Robert W. Ramsuer
*Attorney, Agent, or Firm*—Curtis, Morris & Safford

[57] ABSTRACT

A water-insoluble azo dyestuff of the formula

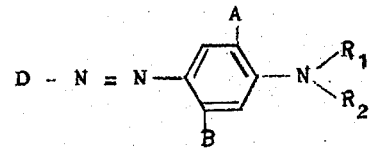

wherein D represents substituted phenyl, thiazolyl or benzothiazolyl radicals; A represents hydrogen, chlorine, lower alkyl lower alkoxy or -O-lower alkylene-lower alkoxy; B represents hydrogen, chlorine, lower alkyl, lower alkoxy, benzoylamino or substituted alkoylamino; $R_1$ and $R_2$ represent substituted or unsubstituted lower alkyl; said compounds being suitable for dyeing or printing fibrous materials, particularly polyesters, the dyeings being of very good fastness to wet processing ironing, waste gas and light and having very good build up properties.

9 Claims, No Drawings

WATER-INSOLUBLE CARBONYLALKYLENE SULFONAMIDO CONTAINING AZO DYESTUFFS

The present invention relates to new, valuable, water-insoluble azo dyestuffs of the general formula (1)

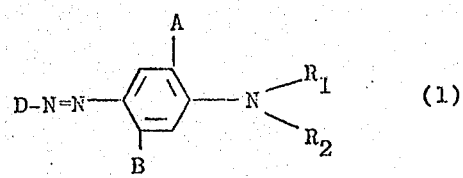

in which D represents the radical of a diazo component of the benzene or heterocyclic series which is free from hydrosolubilizing groups, which may be substituted, for example by halogen atoms such as chlorine or bromine atoms, by nitro, cyano, alkyl, alkoxy, alkylsulfonyl, trifluoromethyl, sulfonamido, acyl, phenoxy, carboxylic acid alkyl ester and/or carboxylic acid amide groups, the alkyl and alkoxyl groups containing 1 to about 4 carbon atoms, and, if D represents a phenyl radical, it may also be substituted by a phenylazo group, A represents a hydrogen atom, a halogen atom such as a chlorine or bromine atom, or an alkyl or alkoxy radical which may be substituted by chlorine or bromine atoms, cyano, hydroxy, alkoxy, acyl or acyloxy groups, the alkyl and alkoxy groups containing 1 to about 4 carbon atoms, B represents a hydrogen atom, a halogen atom such as a chlorine or bromine atom or an alkyl, alkoxy, acylamino radical which may be substituted by chlorine or bromine atoms, cyano, hydroxy, alkoxy, acyl or acyloxy groups or a side chain of the formula (2)

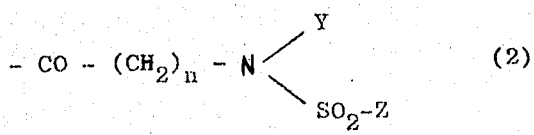

bound over the bridging member

in which Y represents a hydrogen atom or an alkyl or benzyl group or an aryl group which may be substituted by alkyl, alkoxy, acyl or acyloxy groups or halogen atoms such as chlorine or bromine atoms, Z represents an alkyl group or an aryl group which may be substituted by chlorine or bromine atoms, alkyl, alkoxy or nitro group or acyl groups, and $n$ represents an integer from 1 to 6, and R represents a hydrogen atom or an alkyl, acetyl or benzoyl group (the alkyl and alkoxy groups standing for B, Y, Z and R containing 1 to about 10 carbon atoms), and $R_1$ and $R_2$ represent hydrogen atoms or alkyl radicals of 1 to about 4 carbon atoms which may be substituted by chlorine or bromine atoms, cyano, hydroxy, alkoxy, acyl or acyloxy groups or side chains of the afore-mentioned formula (2) which are bound over the bridging member —alkylene—O— or

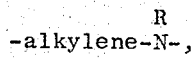

provided that the dyestuff molecule contains once or twice the side chain of the specified formula (2).

By acyl groups, there have to be understood alkyloyl groups containing 2 to about 10 carbon atoms such as the acetyl group and furthermore the benzoyl group, by acyloxy groups there have to be understood alkyloyloxy groups containing 2 to about 10 carbon atoms such as the acetoxy group and furthermore the benzoyloxy group, and by acylamino groups there have to be understood aliphatic alkyloylamino groups containing 2 to about 10 carbon atoms for example the acetylamino group or the benzoylamino group.

If D stands for a heterocyclic radical, it may represent for example a thiazole, benzothiazole, thiadiazole, pyridine, quinoline, pryazole, indazole, triazole or phthalimide radical.

As diazo components D—$NH_2$, on which the dyestuffs of the formula (1) are based, there may be mentioned, for example: aniline, 4-fluoroaniline, 2-chloroaniline, 4-bromoaniline, 2,4,5-trichloroaniline, 4-nitraniline, 3-nitraniline, 2-chloro-4-nitraniline, 2-bromo-4-nitraniline, 2-chloro-4-sulfonamidoaniline, 2,4-dichloroaniline, 2-cyano-4-nitraniline, 2,4-dinitraniline, 6-chloro-2,4-dinatraniline, 6-bromo-2,4-dinitraniline, 2,6-dichloro-4-nitraniline, 4-nitro-2-methylsulfonyl-aniline, 4-amino-acetophenone, 5-nitro-2-aminobenzophenone, 4-acetamino-aniline, 4-amino-benzoic acid ethyl ester, 2-amino-benzoic acid-n-butyl ester, 2-bromo-6-cyano-4-nitraniline, 4-methyl-2-nitraniline, 4-phenylazoaniline, 2-methoxy-4-(4'-nitrophenylazo)-aniline, 2-carbomethoxy-4-nitroaniline, 3-nitro-4-aminoanisole, 4-cyano-2-nitraniline, 4,6-dichloro-2-nitraniline, 2-chloro-4-amino-anisole, 5-chloro-2-amino-anisole, 2,6-dinitro-3-amino-4-methoxy-toluene, 3-nitro-4-amino-benzotrifluoride, 2-aminothiazole, 5-nitro-2-amino-thiazole, 5-carbethoxy-2-aminothiazole, 6-ethoxy-2-amino-benzothiazole, 6-ethylsulfonyl-2-amino-benzothiazole, 5-cyano-2-amino-thiazole, 5-nitro-4-methyl-2-amino-thiazole, 4-methyl-2-aminothiazole, 4-phenyl-2-aminothiazole, 6-chloro-2-amino-benzothiazole, 6-cyano-2-amino-benzothiazole, 6-nitro-2-amino-benzothiazole, 2-amino-1,3,4-thiadiazole, 3-aminopyrazole, 3-aminopyridine and 3-aminoindazole.

Particularly valuable novel dyestuffs encompassed by the general formula (1) are those which correspond to the general formula (3).

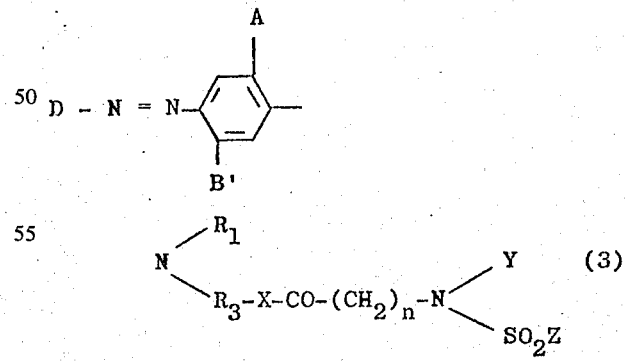

in which X represents an oxygen atom or the group

(R has here the meaning given above) and D, A, $R_1$, Y, Z and $n$ have the meanings given above and B' has the meaning given here-above for B, provided that B' does not contain a side chain of the formula (2), and $R_3$ represents an alkylene group of 2 to 4 carbon atoms, for example the ethylene or propylene group.

Further particularly valuable novel dyestuffs encompassed by the formula (1) are those which correspond to the general formula

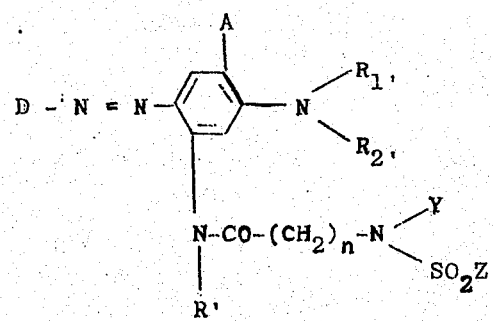

in which D, A, Y, Z and $n$ have the meanings given above, $R_1'$ and $R_2'$ have the meanings given above for $R_1$ and $R_2$, provided that $R_1'$ and $R_2'$ do not contain a side chain of the general formula (2), and R' represents a hydrogen atom or an acetyl group.

The novel dyestuffs designated as being particularly valuable and corresponding to the above-specified general formula (3) and (4) are distinguished by particularly good properties of fastness to sublimation in the dyeing and printing of synthetic fibrous materials.

The present invention furthermore relates a. to a process for the manufacture of dyestuffs of the general formula (1), wherein a diazo component of the general formula (5)

in which D has the meanings given above, is diazotized, for example with sodium nitrite and a mineral acid or a with a solution of nitrosyl-sulfuric acid in concentrated sulfuric acid, and coupled with a coupling component of the general formula (6)

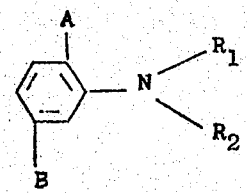

in which A, B, $R_1$ and $R_2$ have the meanings given above, provided that the mentioned coupling component contains in its molecule 1 or 2 times the side chain of the formula (2), in an acid to neutral, preferably aqueous medium, optionally with the addition of solvents, for example mono- or bi-hydric alcohols, acetone or glacial acetic acid, and optionally in the presence of acidbinding agents, for example sodium acetate, magnesium carbonate or pyridine, the addition of which may often be of advantage.

b. to a process for the manufacture of dyestuffs of the general formula (3), wherein a diazo component of the general formula (5) is diazotized, for example in the manner described under (a) and coupled with a coupling component of the general formula (7)

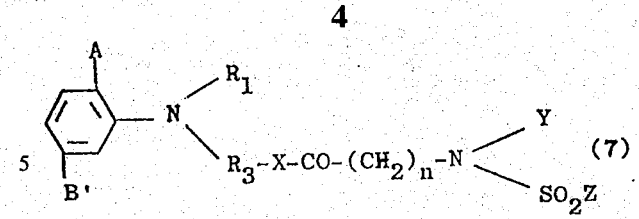

in which A, B', $R_1$, $R_3$, X, Y, Z and $n$ have the meanings given above, in the manner described, for example under (a), c. to a process for the manufacture of dyestuffs of the general formula (4), wherein a diazo component of the general formula (5) is diazotized, for example in the manner described under (a) and coupled with a coupling component of the general formula (8)

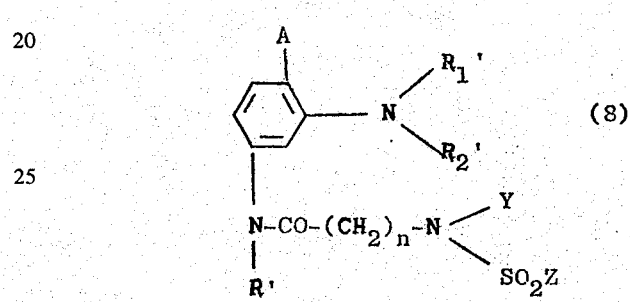

in which A, R', $R_1'$, $R_2'$, Y, Z and $n$ have the meanings given above, in the manner described, for example under (a), and d. to a process for the manufacture of dyestuffs of the general formula (3), wherein a dyestuff of the general formula (9)

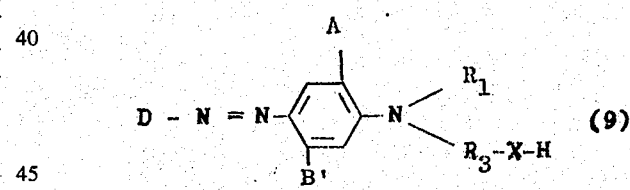

in which D, A, B', $R_1$, $R_3$ and X have the meanings given above, is acylated with a carboxylic acid of the general formula (10)

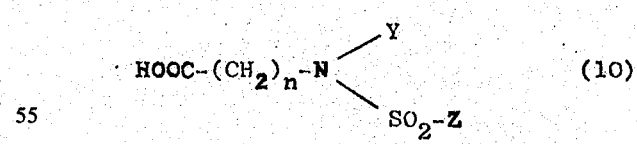

in which Y, Z and $n$ have the meanings given above, or preferably with a functional derivative of such an acid, for example and acid anhydride or an acid halide such as the acid bromide or, preferably the acid chloride, at temperatures in the range of from about 20°C to about 100°C, suitably in an inert organic solvent and optionally in the presence of an acid-binding agent.

As acid-binding agent, there is preferably used pyridine, a mixture of pyridine bases, quinoline or also a low molecular trialkyl-amine, for example triethylamine. When using a halide of the acid of the mentioned formula (10), it is of advantage to add an acid-binding agent to the esterification mixture. As inert organic solvents, there may be used, for example hydrocarbons such as benzene, toluene, xylene, halogenated hydrocarbons such as chloroform, carbon tetrachloride, methylene chloride, trichloroethylene, chlorobenzene, bromobenzene, ketones such as acetone, methyl-ethyl ketone, methyl-isobutyl ketone, furthermore esters such as di-ethyl ether, di-isopropyl ether, dioxane, 1,2-dimethoxyethane, methoxy- or ethoxy-benzene, as well as sulfolane (tetramethylenesulfone).

The dyestuffs are obtained in water-insoluble form and isolated, for example by filtration and freed from adhering electrolytes by washing with water.

Instead of a uniform diazo component, there may be used in the mentioned process variants (a), (b) and (c) also a mixture of two or more diazo components and instead of the uniform coupling component a mixture of two or more coupling components.

The novel dyestuffs are suitable either alone or as mixtures with each other or with other dyestuffs, preferably in the form of a preparation, for example in an aqueous dispersion or in solutions with organic solvent or in emulsions or dispersions which contain a solvent or a mixture of solvents also water, for the dyeing or printing of synthetic fibrous materials, for example fibers of cellulose di-acetate, 2½-acetate and triacetate, polyamides such as poly- ε-caprolactam or polyhexamethylenediamine-adipate, polyurethanes, polyolefins, polycarbonates, in particular, however polyesters such as polyethylene terephthalates.

For the dyeing or printing, the above-mentioned synthetic fibrous materials may also be present in admixture with one another or with natural fibrous materials such as cellulose fibres or wool. For dyeing, they may be present in various processing stages, for example as combed material, as flocks, filaments, fabrics or knit fabrics.

The dyestuffs of the invention are applied in known manner, in general from an aqueous dispersion, but also from organic solvents. The dyestuffs can be dispersed, for example, by grinding them in the presence of a dispersing agent, for example the condensation product of formaldehyde and a naphthalene-sulfonic acid.

Otherwise, the dyeing conditions depend largely on the nature of the synthetic fibrous materials and their processing stage.

The dyeing of shaped bodies of cellulose acetate is effected, for example, in a temperature range of from 75° to 85°C. Cellulose triacetate fibers are dyed at temperatures between about 90° and 125°C. The dyestuffs are applied onto polyamide fiber materials in the temperature range of from about 90° ato 120°C, For the dyeing of fibrous materials of polyesters, the methods known for this purpose are used, i.e. by dyeing the fibrous material in the presence of carriers such as o- or p-phenylphenol, methylnaphthalene or methyl salicylate, at temperature of about 100° to about 130°C or, if no carriers are used, at correspondingly higher temperatures, for example at temperatures between 120° and 140°C. Furthermore, the dyestuffs may be applied by padding while using or not a thickener, for example tragacanth thickener, and fixed by the action of heat, for example dry heat or steam, for about one-half to 30 minutes at temperatures in the range of from about 100° to 230° C. In order to improve the fastness to rubbing, the material so dyed is then freed from dyestuff adhering to the surface, for example by rinsing or by a reductive after-treatment. This after-treatment is generally carried out at 60° to 120°C in a bath which contains aqueous sodium hydroxide solution, sodium dithionite and a non-ionic detergent, for example an addition product of ethylene oxide and phenol.

For dyeing the synthetic fibrous materials from organic solvents, the dyestuff is allowed to be absorbed onto the fiber from the solution at room temperature or an elevated temperature, for example at a temperature in the range of from about 70° to 130°C, if desired under pressure, or in a continuous method of operation, the fabrics or knit fabrics are impregnated with a dyestuff solution, dried and subjected for a short time to the action of heat, for example to a temperature in the range of from 180° to 210°C. For the exhaust process, there may be mentioned, as solvents, for example solvents which are immiscible with water and have a boiling point in the range of from 40° to 170°C, for example aliphatic halogenated hydrocarbons such as methylene chloride, trichloroethane. For a continuous dyeing method, there may also be used solvents which are miscible with water, for example alcohols or dimethylformamide. The solvents may, of course, also be used in the form of mixtures and contain other auxiliary agents which are miscible in solvents, for example oxalkylation products of fat alcohols, alkyl phenols and fatty acids.

For preparing prints on synthetic fibrous materials, for example of polyesters, polyamides or cellulose triacetate, the dyestuffs of the invention are applied in the form of water-containing preparations which may contain, in addition to the finely distributed dyestuff, suitable thickeners and fixing accelerators. Fixation is effected after printing and drying, for example by steaming at atmospheric pressure or under elevated pressure of up to 2.5 atmospheres gauge pressure for 10 to 60 minutes. Fixation can also be effected by the action of hot air of 160° to 210°C during 30 seconds to 10 minutes.

In this manner the novel dyestuffs permit the production on the said synthetic fibrous materials of intense dyeings which have very good fastness to wet processing, to sublimation, to exhaust gases and to light and which have a very good build-up. When used for the dyeing of mixed fabrics of polyester fibers and wool, the novel dyestuffs dye only slightly the wool portion while dyeing in a good tinctorial yield the polyester portion. The staining of the wool portion can be easily removed by a washing with emulsifiers or by a treatment with reducing agents.

The following Examples illustrate the invention:

EXAMPLE 1

Dyestuff of the formula

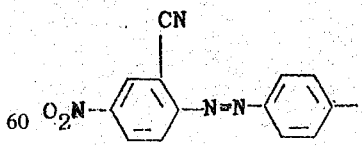

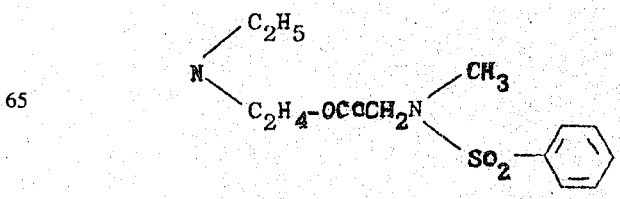

a. Preparation of the coupling component 33 g (0.2 mole) of N-ethyl-N-oxethyl-aniline were dissolved in 150 ml of anhydrous benzene, combined with 16 ml of pyridine, and then a solution of 50 g of N-phenyl-sulfone-N-methyl-amino-acetic acid chloride, which had been obtained by the reaction of benzene sulfochloride with methylaminoacetic acid and following conversion into the acid chloride with thionyl chloride, in 50 ml of benzene was added dropwise at 23°C, while stirring. The reaction was completed by stirring at about 40°C in about 30 minutes. After the usual working up, there were obtained 73.5 g of a viscous oil which solidified after some time.

b. Preparation of the dyestuff 16.3 g (0.1 mole) of 2-cyano-4-nitro-aniline were dissolved at 0°–15°C in 70 g of 98% sulfuric acid and diazotized at the same temperature by the addition of 32 g of 40% by weight nitrosyl-sulfuric acid.

The diazo solution was added dropwise, while well cooling, to a solution of 37.6 g (0.1 mole) of the coupling component that had been prepared as described in 400 ml of glacial acetic acid and 400 ml of ice water. Stirring was continued for 2 hours in order to complete coupling and the pH-value was adjusted to 5.5 by the addition of sodium acetate. The dyestuff which had precipitated and corresponded to the above formula was filtered off with suction, washed with water until it was free from salt and acid and dried.

When applied from an aqueous dispersion or from a solution in an organic solvent, the dyestuff yielded ruby red dyeings and prints on polyester and cellulose acetate fibers which had excellent properties of fastness. On polyamide fibers violet red dyeings were obtained which likewise had very good fastness properties.

EXAMPLE 2

Dyestuff of the formula

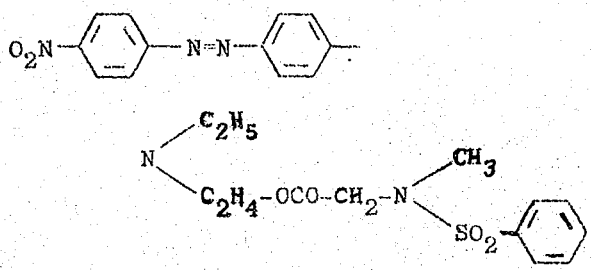

37.6 g (0.2 mole) of 4-nitro-aniline were dissolved in 150 ml of 5N-hydrochloric acid by heating and poured, while stirring, into a mixture of 1 liter of water, 40 ml of 5N-aqueous sodium nitrite solution and 500 g of ice.

The diazo solution so obtained was then added dropwise to a solution of 33 g (0.2 mole) of N-ethyl-N-β-oxethyl-aniline in 1 liter of water and 100 ml of 5N-hydrochloric acid. Stirring was continued for 2 hours at 10°–15°C in order to complete coupling and the pH-value was then adjusted to 5.5 by the addition of sodium acetate. The dyestuff that had precipitated and corresponded to the formula

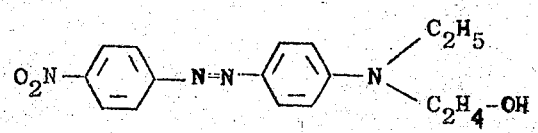

was filtered off with suction, washed with water until it was free from salt and neutral and dried.

33.9 g (0.1 mole) of the dyestuff of the above-specified formula were dissolved in 1 liter of benzene and 9 ml of pyridine and acylated by the dropwise addition of a solution of 27 g (0.11 mole) of N-phenylsulfone-N-methyl-aminoacetic acid chloride in 50 ml of benzene and following heating. After removal of the solvent, the dyestuff of the formula

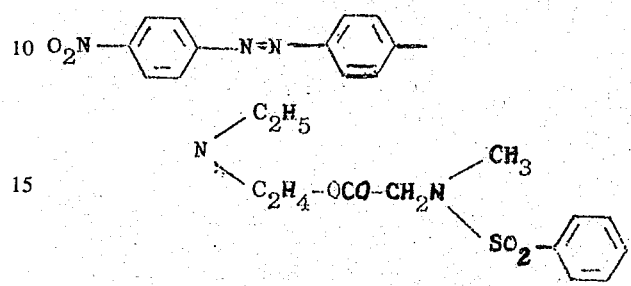

was isolated and yielded on polyester fibers yellowish red dyeings that had very good properties of fastness.

EXAMPLE 3

Dyestuff of the formula

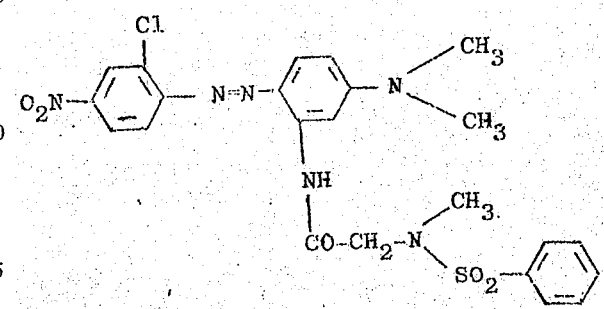

a. Preparation of the coupling component 27.2 g (0.2 mole) of 3-amino-dimethylaniline were dissolved in 200 ml of chloroform and 18 g of pyridine (0.22 mole). 54.4 g of N-phenylsulfone-N-methyl-aminoacetic acid chloride dissolved in 100 ml of chloroform were added dropwise. The mixture was heated for 5 hours to the boiling temperature under reflux. After having allowed the reaction mixture to cool, it was extracted with water, dried with calcium chloride and the organic solvent was completely removed by evaporation. The residue was used as coupling component.

b. Preparation of the dyestuff 17.2 g (0.1 mole) of 2-chloro-4-nitraniline were dissolved in 75 ml of concentrated sulfuric acid and diazotized at 10°C with 31.8 g of 40% nitrosyl-sulfuric acid. Stirring was then continued for 90 minutes in order to complete the reaction.

34.7 g (0.1 mole) of the above coupling component were dissolved in 200 ml of water, 200 ml of acetone and 40 ml of concentrated hydrochloric acid. The above-mentioned diazo component was then added while cooling externally and adding ice, the addition being carried out dropwise. Then, further ice was added and stirring was continued for 3 hours in order to complete coupling. The dyestuff precipitated in crystalline form. It was filtered off with suction, washed until neutral and dried. The dyestuff so obtained yielded on polyester fibers neutral red dyeings that had excellent fastness to sublimation.

EXAMPLE 4

Dyestuff of the formula

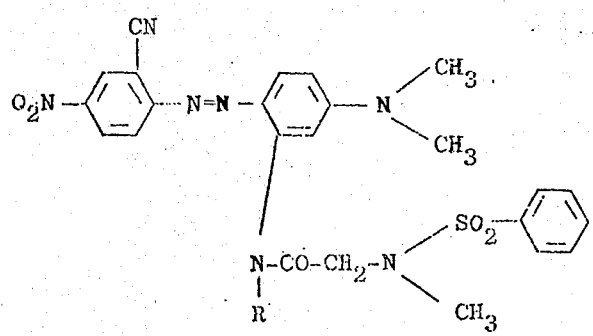

( R = H and —COCH₃)

a. Preparation of the coupling component 27.2 g (0.2 mole) of 3-amino-dimethylaniline were dissolved in 200 ml of chloroform and 18 g of pyridine (0.22 mole). Then, 54.4 g of N-phenylsulfone-N-methyl-aminoacetic acid chloride (0.22 mole), dissolved in 100 ml of chloroform, were added dropwise. The mixture was heated for 5 hours to the boiling temperature under reflux. After having allowed the reaction mixture to cool, it was extracted with water, dried with calcium chloride and the organic solvent was completely removed by evaporation. The residue, constituting the 3-(N'-phenylsulfone-N'-methylamino-acetyl)-amino-N,N-dimethylaniline, was dissolved in 100 ml of acetanhydride and heated for 5 hours under reflux. After having cooled, the reaction solution could be used directly for the coupling reaction.

b. Preparation of the dyestuff 16.3 g (0.1 mole) of 2-cyano-4-nitraniline were dissolved in 75 ml of concentrated sulfuric acid and diazotized at −5°C with 31.8 g of 40% nitrosyl-sulfuric acid. Stirring was continued for 90 minutes in order to complete the reaction.

0.1 mole of a solution of the above coupling component were diluted with 200 ml of water and 200 ml of glacial acetic acid. The above-mentioned diazo component was added dropwise, while cooling externally and adding ice. Subsequently, ice was added and stirring was continued for 3 hours in order to complete the coupling reaction. The dyestuff precipitated in crystalline form. it was filtered off with suction, washed until neutral and dried. I yielded on polyester fibers a violet dyeing that had very good properties of fastness.

The dyestuffs of the formula (1) indicated in the following Table

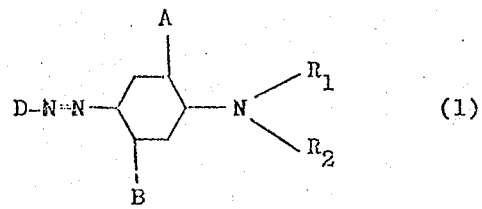

were obtained in a manner similar to that described in the foregoing Examples and yielded on polyester fibers the indicated shades which had good properties of fastness.

| Example No. | D | A | B | $R_1$ | $R_2$ | Shade |
|---|---|---|---|---|---|---|
| 5 | $O_2N$-⟨Cl⟩- | H | H | $-(CH_2)_2OCOCH_2N(CH_3)(SO_2C_2H_5)$ | $-C_4H_9(n)$ | red |
| 6 | " | H | H | $-(CH_2)_2OCOCH_2N(CH_3)(SO_2-⟨⟩)$ | $-C_2H_4CN$ | orange red |
| 7 | " | H | H | " | $-C_2H_4-⟨⟩$ | red |
| 8 | $O_2N$-⟨CN⟩- | H | H | " | $-C_3H_7$ | ruby red |
| 9 | " | H | $-CH_3$ | " | $-CH_3$ | ruby red |
| 10 | " | $-OC_2H_4OCH_3$ | Cl | " | $-CH_2-⟨⟩$ | red violet |
| 11 | $O_2N$-⟨CN⟩- | $-OCH_3$ | $-CH_3$ | $-(CH_2)_2OCOCH_2N(CH_3)(SO_2-⟨⟩)$ | $-C_4H_9(n)$ | reddish blue |
| 12 | " | H | H | $-(CH_2)_3NHCOCH_2N(CH_3)(SO_2-⟨⟩)$ | $-C_2H_5$ | bluish red |

| Example No. | D | A | B | $R_1$ | $R_2$ | Shade |
|---|---|---|---|---|---|---|
| 13 | 4-Cl-2-CH3-3,5-dinitrophenyl ($O_2N$-, $NO_2$, Cl) | $-OC_2H_5$ | $-NHCOCH_3$ | $-(CH_2)_2OCOCH_2N(CH_3)(SO_2\text{-}C_6H_4\text{-}CH_3)$ | $-R_1$ | blue |
| 14 | " | $-OCH_3$ | " | " | $-C_2H_4CN$ | blue |
| 15 | 4-Cl-2-CH3-3,5-dinitrophenyl | $-COCH_3$ | $-CH_3$ | $-(CH_2)_2OCOCH_2N(CH_3)(SO_2C_6H_5)$ | $-C_4H_9(n)$ | blue |
| 16 | 4-Br-2-CH3-5-CN-nitrophenyl | $-OCH_3$ | $-CH_3$ | $-(CH_2)_2OCOCH_2N(CH_3)(SO_2C_6H_5)$ | $-C_4H_9(n)$ | blue |
| 17 | " | " | " | $-(CH_2)_2OCOCH_2N(C_6H_5)(SO_2C_4H_9)$ | H | blue |
| 18 | 2-SO2CH3-4-nitrophenyl | H | H | $-(CH_2)_2COOCH_2N(C_2H_5)(SO_2C_6H_5)$ | $-C_2H_5$ | bluish red |
| 19 | 6-nitrobenzothiazol-2-yl | H | H | $-(CH_2)_2CCO(CH_2)_5N(CH_3)(SO_2C_6H_5)$ | $-C_2H_5$ | ruby red |
| 20 | " | H | H | " | $-(CH_2)_2COCH_3$ | ruby red |
| 21 | 4-nitrophenyl | H | $-NHCO\text{-}C_6H_5$ | $-(CH_2)_2COOCH_2N(CH_3)(SO_2\text{-}C_6H_4\text{-}NO_2)$ | $-CH_3$ | scarlet |
| 22 | " | H | H | $-(CH_2)_2COOCH_2N(C_4H_9)(SO_2C_6H_5)$ | $-C_2H_5$ | orange red |
| 23 | 2,6-dichloro-4-nitrophenyl | H | H | $-(CH_2)_2OCOCH_2N(CH_2C_6H_5)(SO_2\text{-}CH_3)$ | " | yellow brown |
| 24 | 2,6-dichloro-4-nitrophenyl | H | Cl | $-(CH_2)_2OCO(CH_2)_3N(CH_3)(SO_2C_6H_5)$ | $-R_1$ | yellow brown |
| 25 | 2-CN-4-nitrophenyl | Cl | H | $-(CH_2)_3NHCOCH_2N(CH_3)(SO_2C_6H_5)$ | H | red |
| 26 | " | H | H | $-(CH_2)_2OCOCH_2NHSO_2\text{-}C_6H_5$ | $-C_2H_5$ | ruby red |
| 27 | 2-Br-4,6-dinitrophenyl | $-OC_2H_5$ | $-NHCOCH_3$ | $-(CH_2)_2OCOCH_2N(CH_3)(SO_2C_6H_5)$ und $-(CH_2)_2OH$ | $-R_1$ | blue |

-Continued

| Example No. | D | A | B | R₁ | R₂ | Shade |
|---|---|---|---|---|---|---|
| 28 | " | " | " | $-(CH_2)_2OCOCH_2N(CH_3)(SO_2C_6H_5)$ | $-C_2H_5$ | blue |
| 29 | 2,4-dinitro-6-bromophenyl | $-OCH_3$ | $-NHCOCH_3$ | $-(CH_2)_2OCOCH_2N(CH_3)(SO_2C_6H_5)$ und $-(CH_2)_2OCOCH_3$ | $-R_1$ | blue |
| 30 | $C_6H_5-N=N-C_6H_4-$ | H | H | $-(CH_2)_2OCOCH_2N(C_2H_5)(SO_2C_6H_5)$ | $-CH_3$ | orange |
| 31 | 2-chloro-5-trifluoromethylphenyl | H | H | $-(CH_2)_2OCOCH_2N(CH_3)(SO_2C_6H_5)$ | $-C_2H_5$ | reddish yellow |
| 32 | 2,4-dinitrophenyl | H | $-OCCH_3$ | $-(CH_2)_3NHCOCH_2N(CH_3)(SO_2C_6H_5)$ | H | bluish red |
| 33 | 2-ethoxycarbonyl-thiazol-5-yl | H | H | $-(CH_2)_2OCOCH_2N(CH_3)(SO_2-C_6H_4-o-NO_2)$ | $-C_2H_5$ | bluish red |
| 34 | 2-nitro-thiazol-5-yl | H | H | $-(CH_2)_2OCOCH_2N(CH_3)(SO_2C_6H_5)$ | $-C_2H_5$ | violet |
| 35 | 2-acetyl-4-nitrophenyl | H | " | $-(CH_2)_2OCOCH_2N(CH_3)(SO_2C_6H_5)$ | $-C_2H_5$ | yellowish red |
| 36 | 2-bromo-4-nitro-6-chlorophenyl | H | " | " | " | yellow brown |
| 37 | 4-nitrophenyl | H | $-NHCOC_2H_5$ | $-(CH_2)_2OCOCH_2N(CH_3)(SO_2C_6H_5)$ | $-C_2H_5$ | orange |
| 38 | 2-chloro-4-nitrophenyl | H | $-NHCOCH_2-N(CH_3)(SO_2C_6H_5)$ | $-CH_3$ | $-CH_3$ | red |
| 39 | 2-chloro-4-nitrophenyl | $-CH_3$ | $-NHCOCH_2-N(CH_3)(SO_2-C_6H_4-CH_3)$ | $-C_2H_5$ | $-C_2H_5$ | red |
| 40 | 2-cyano-4-nitrophenyl | H | $-NH-CO-CH_2-CH_2-CH_2-C_6H_4-SO_2-N(CH_3)$ | $-C_2H_5$ | $-CH_2CH_2CN$ | bluish red |
| 41 | 2-cyano-4-nitrophenyl | H | $-NCOCH_2-SO_2-C_6H_5$ (CH_3, COCH_3) | $-CH_3$ | $-CH_2CH_2CN$ | violet |

—Continued

| Example No. | D | A | B | R₁ | R₂ | Shade |
|---|---|---|---|---|---|---|
| 42 | H₃CO₂S—⟨Cl⟩— | H | —NHCOCH₂—N—SO₂—⟨⟩<br>　　　　　　CH₃ | —C₂H₅ | —C₂H₅ | scarlet |
| 43 | O₂N—⟨Br,Cl⟩— | H | —NHCOCH₂—N—SO₂CH₃<br>　　　　　　C₄H₉ | —CH₃ | —CH₃ | brown |
| 44 | O₂N—⟨Cl,NO₂⟩— | H | —NHCO(CH₂)₅—N—SO₂—⟨⟩<br>　　　　　　　　CH₃ | —C₂H₅ | —C₂H₅ | reddish blue |
| 45 | O₂N—⟨CN,Br⟩— | H | —N—COCH₂—N—SO₂—⟨⟩<br>　CH₃　　CH₃ | —C₄H₉ | —CH₂CH₂CN | blue |
| 46 | O₂N—⟨Br,NO₂⟩— | —OCH₃ | —NHCO(CH₂)₅NH—SO₂—⟨⟩ | —C₂H₅ | —C₂H₅ | blue |
| 47 | O₂N—⟨⟩— | H | —NHCOCH₂N—CH₂—⟨⟩<br>　　　　　SO₂—CH₃ | —C₂H₅ | —C₂H₅ | scarlet |
| 48 | O₂N—⟨⟩— | H | —NHCOCH₂N—SO₂—⟨⟩<br>　　　　　CH₃ | —C₂H₄OCOCH₃ | —C₂H₄OCOCH₃ | scarlet |

We claim:
1. A compound of the formula

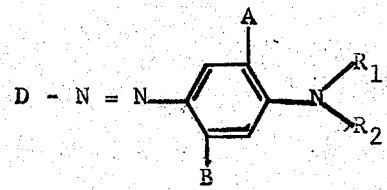

in which
D represents nitro-phenylene, dinitro-phenylene, carbo-lower alkoxy-phenylene, chloro-nitro-phenylene, cyano-nitrophenylene, dichloro-nitro-phenylene, chloro-bromo-nitro-phenylene, chloro-dinitro-phenylene, bromo-dinitro-phenylene, chloro-lower alkyl sulfonyl-phenylene, nitro-lower alkylsulfonyl-phenylene, bromo-cyano-nitro-phenylene, chloro-trifluoromethyl-phenylene, phenylazo-phenylene, A represents hydrogen, chlorine, lower alkyl, lower alkoxy or —O—lower alkylene-lower alkoxy, B represents hydrogen, chlorine, lower alkyl, lower alkoxy, lower alkloylamino, benzoylamino, —NH—CO—lower alkylene—N—SO₂—lower alkyl,
　　　　　　　　　　　　｜
　　　　　　　　　　lower alkyl —NH—CO—lower alkylene—N—SO₂—,
　　　　　　　　　　　　｜
　　　　　　　　　　lower alkyl —NH—CO—lower alkylene—N—SO₂——lower alkyl,
　　　　　　　　　　　　｜
　　　　　　　　　　lower alkyl —N—CO—lower alkylene—N—SO₂—,
　｜　　　　　　　　　　｜
lower alkyl　　　　　lower alkyl

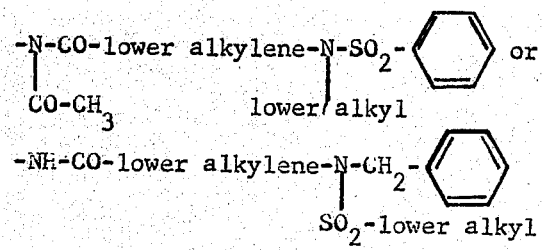
R₁ represents lower alkyl, lower alkylene-OH,
and R₂ represents hydrogen, lower alkyl, -lower alkylene-OH, lower alkylene-CN,
lower alkylene-O-C-lower alkyl,
       ‖
       O
lower alkylene-⌬ ,     -lower alkylene-C- lower alkyl,
                                       ‖
                                       O
-lower alkylene-O-C- lower alkyl,
                ‖
                O

-lower alkylene-O-CO-lower alkylene-N 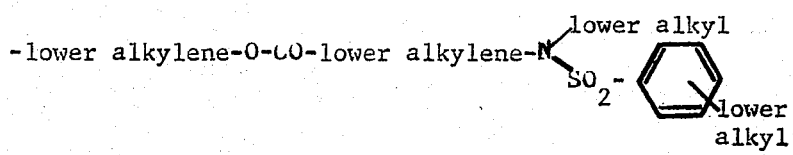

providing that at least one of B, R₁, and R₂ contain the group of the formula —CO—(CH₂)ₙ—N—SO₂—, wherein $n$ is an integer from 1 to 6.

2. The compound of claim 1 wherein R₁ is lower alkyl, lower alkylene —OH, or lower alkylene —O—CO—lower alkyl, R₂ is hydrogen, lower alkyl, lower alkylene —OH, lower alkylene —CN,

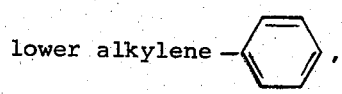

lower alkylene —CO— lower alkyl or lower alkylene —O—CO— lower alkyl.

3. The compound of claim 1 wherein B is hydrogen, chlorine, lower alkyl, lower alkoxy, lower alkyloylamino or benzoylamino.

4. Compound of the formula

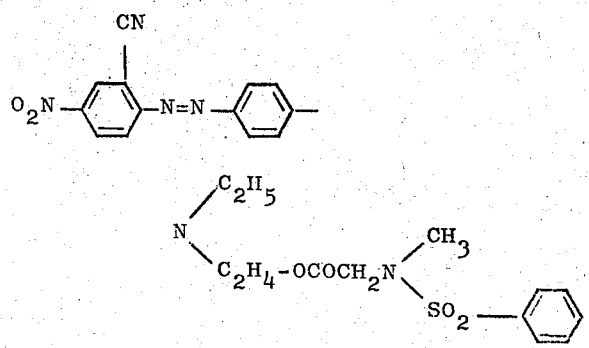

5. Compound of the formula

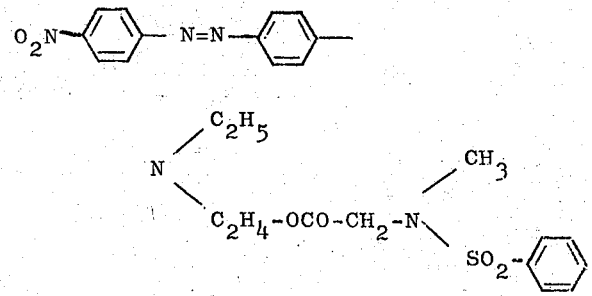

6. Compound of the formula

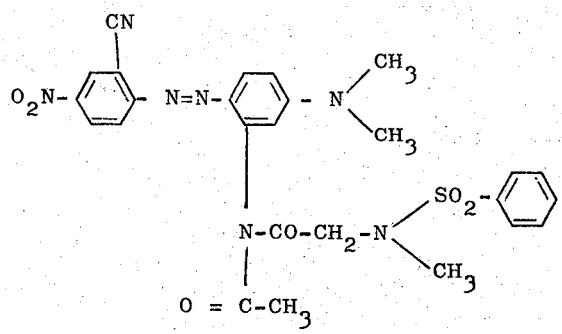

7. Compound of the formula

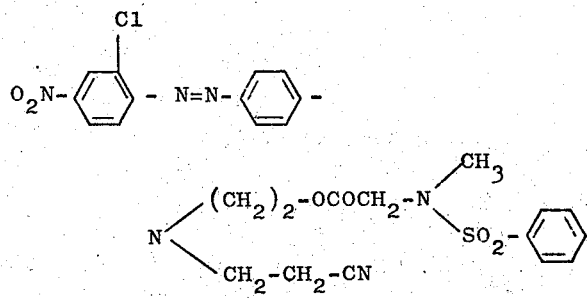

8. Compound of the formula

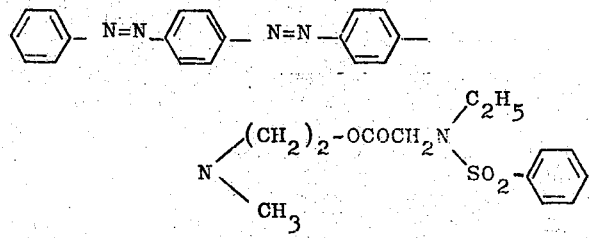

9. Compound of the formula

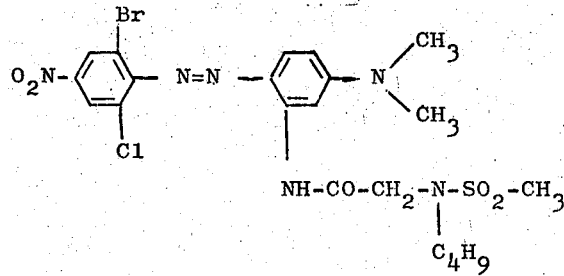

* * * * *